United States Patent
Zhang

(10) Patent No.: US 10,473,450 B2
(45) Date of Patent: Nov. 12, 2019

(54) SENSOR CORRECTION METHOD, APPARATUS AND ELECTRONIC DEVICE

(71) Applicant: Lenovo (Beijing) Limited, Beijing (CN)

(72) Inventor: Shuxian Zhang, Beijing (CN)

(73) Assignee: Lenovo (Singapore) Pte. Ltd., Singapore (SG)

(*) Notice: Subject to any disclaimer, the term of this patent is extended or adjusted under 35 U.S.C. 154(b) by 7 days.

(21) Appl. No.: 15/612,857

(22) Filed: Jun. 2, 2017

(65) Prior Publication Data

US 2017/0350687 A1 Dec. 7, 2017

(30) Foreign Application Priority Data

Jun. 3, 2016 (CN) .................... 2016 1 0391367

(51) Int. Cl.
  *G01B 7/30* (2006.01)
  *G06F 7/548* (2006.01)
  *G06F 1/16* (2006.01)
  *H04B 1/3827* (2015.01)

(52) U.S. Cl.
  CPC .......... *G01B 7/30* (2013.01); *G06F 1/1615* (2013.01); *G06F 1/1616* (2013.01); *G06F 1/1677* (2013.01); *G06F 7/548* (2013.01); *H04B 1/3838* (2013.01)

(58) Field of Classification Search
  CPC ............................ G01B 7/30; G06F 1/1677
  See application file for complete search history.

(56) References Cited

U.S. PATENT DOCUMENTS 9,042,833 B1 5/2015 Jayaraj et al.
2007/0279396 A1* 12/2007 Miyagawa ........... G06F 1/1616
                                                              345/173
2014/0043259 A1 2/2014 Park

FOREIGN PATENT DOCUMENTS

CN 101751179 A 6/2010
CN 103179653 A 6/2013

* cited by examiner

*Primary Examiner* — Yu-Hsi D Sun
(74) *Attorney, Agent, or Firm* — Ference & Associates LLC

(57) ABSTRACT

One embodiment provides a method, including: identifying, using at least one sensor, an angle value between a first body and a second body of an electronic device; determining, using a processor, whether the angle value between the first body and the second body is greater than a predetermined threshold value; and correcting, responsive to determining that the angle value between the first body and the second body is greater than the predetermined threshold value, a decision threshold. Other aspects are described and claimed.

20 Claims, 5 Drawing Sheets

SENSOR CORRECTION METHOD, APPARATUS AND ELECTRONIC DEVICE

CLAIM FOR PRIORITY

This application claims priority to Chinese Application No. 201610391367.X, filed on Jun. 3, 2016, which is fully incorporated by reference herein.

FIELD

The subject matter described herein relates to the technical field of signal detection and processing, and in particular, to a sensor correction method, apparatus and electronic device.

BACKGROUND

SAR (specific absorption rate) is used for measuring the ability of an organism to absorb radiation, and in particular, refers to the rate of radiation absorbed by biological soft tissues. The lower the SAR value is, the smaller the rate of radiation absorbed by the organism would be.

BRIEF SUMMARY

In summary, one aspect provides a method, comprising: identifying, using at least one sensor, an angle value between a first body and a second body of an electronic device; determining, using a processor, the angle value between the first body and the second body; and correcting, responsive to determining the angle value between the first body and the second body, a decision threshold.

Another aspect provides an electronic device, comprising: a first body; a second body; at least one sensor; a processor; a memory device that stores instructions executable by the processor to: identify an angle value between the first body and the second body of the electronic device; determine the angle value between the first body and the second body; and correct, responsive to determining that the angle value between the first body and the second body, a decision threshold.

A further aspect provides a product, comprising: a storage device that stores code, the code being executable by a processor and comprising: code that identifies an angle value between a first body and a second body of an electronic device; code that determines the angle value between the first body and the second body; and code that corrects, responsive to the code that determines the angle value between the first body and the second body, a decision threshold.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
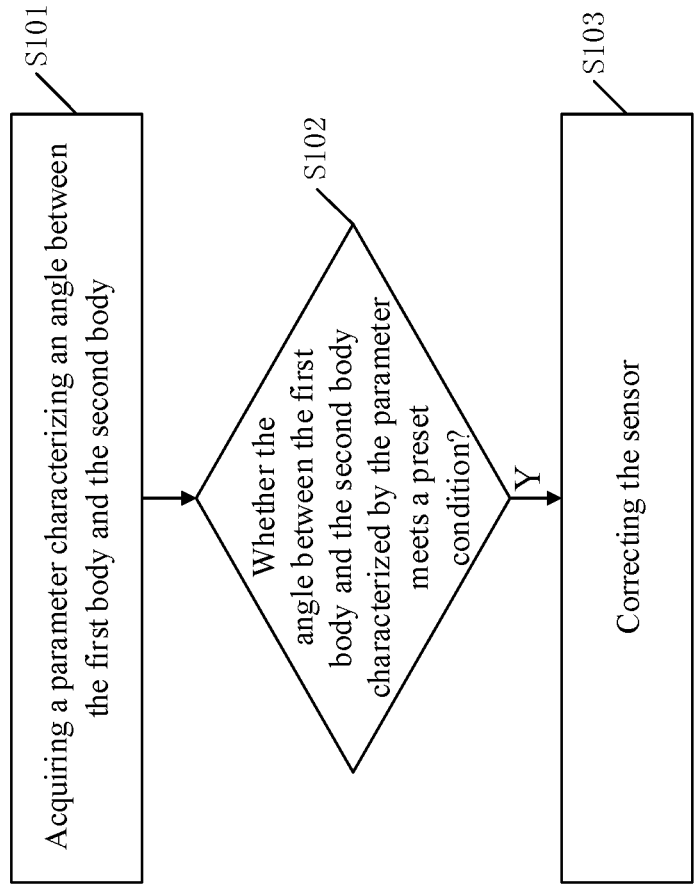
FIG. 1 is a structural schematic flow diagram illustrating a sensor correction method according to an embodiment.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

In view of the hazards of electromagnetic radiation, SAR of mobile phones, notebook computers and other terminal devices is generally reduced through reducing the transmission power of the antenna of the device when it is detected that a human body is close to it (such as, for example, if the capacitance value detected by a capacitive sensor integrated in the device exceeds a certain threshold, it means a human body is close to it), so as to reduce the electromagnetic radiation of the device toward the human body. On the contrary, when the human body is far away from the device, the normal transmission power of the antenna will be recovered. When the main screen (display screen) of an electronic product such as an notebook computer rotates around the rotating shaft, the relative position of the main screen with respect to the auxiliary screen (the keyboard region and motherboard part under the keyboard) will change, which results in a change of the electromagnetic field around the capacitive sensor, and the change of the electromagnetic field will affect the detection of the surrounding capacitance value, which in turn may cause misjudgment on the proximal state/distal state of the human body. For example, when a human body is far away from the electronic device, it is mistakenly determined as the human body being close to it, resulting in an improper change of the transmission power of the antenna.

Based on this, in the art, for electronic products such as notebook computers, a correction mechanism for correcting the capacitive sensor is needed to ensure that the transmission power of an antenna can be properly adjusted.

Embodiment 1

Referring now to FIG. 1, a structural schematic flow diagram illustrating a sensor correction method according to an embodiment is provided. The method can be used in an electronic device, such as a notebook computer. The electronic device comprises a sensor, a first body and a second body. As shown in FIG. 1, the method may comprise the following steps.

At step S101, an embodiment may acquire a parameter characterizing an angle between the first body and the second body. For an electronic device, such as a notebook computer, the first body can be the main screen (display screen) of the notebook computer, and the second body can be the auxiliary screen (keyboard area and motherboard part under the keyboard) of the notebook computer. Of course, the first body can be the auxiliary screen and the second screen can be the main screen, but they are not particularly limited in this application. Specifically, this embodiment will elaborate the method of the present application with the first body being the main screen and the second body being the auxiliary screen.

The sensor corresponds to a decision threshold. When a first data collected by the sensor is less than the decision threshold, the first data corresponds to a first decision result. When a second data collected by the sensor is not less than the decision threshold, the second data corresponds to a second decision result.

For an electronic device such as a notebook computer, the sensor can be a capacitive sensor in the notebook computer for detecting the proximal state or distal state of a human body relative to the electronic device. The capacitive sensor outputs a detection result by detecting a surrounding capacitance value (e.g., including a capacitance generated based on factors such as the sensor itself, components in the electronic device, the surrounding environment, etc.).

In the prior art, the capacitive sensor corresponds to a preset constant decision threshold. When the detected capacitance value reaches the threshold, it is determined that an object with relatively high capacitance, such as a human body, is close to it. When the detected capacitance value is less than the threshold, it is determined that no object with relatively high capacitance is close to it. For example, suppose that the surrounding capacitance value detected by the capacitive sensor is 10 when no human body is close to the electronic device and the capacitance value of a human body is 10. The decision threshold can be a particular value between 10 and 20. Supposing that the decision threshold is 15 and the capacitance value detected by the capacitive sensor is 20 when a human body is close to the electronic device, which reaches the set threshold, then the capacitive sensor would detect that a human body is close to the electronic device. Conversely, when the value detected by the capacitive sensor is less than the threshold, it is decided that no human body is in the proximal state.

However, for an electronic product such as a notebook computer, when the first body of the notebook computer rotates around the rotating shaft (i.e., the angle between the first body and the second body is changed), the relative positions of the components in the first body with respect to the second body will be changed, and accordingly, the electromagnetic field around the capacitive sensor will be changed, which will affect the detection of the surrounding capacitance value. For example, the surrounding capacitance value may be detected as 20 when no human body is close to it, which causes a mistaken determination that a human body is close to it. Alternatively, but in the same vein, the surrounding capacitance value may be detected as 14 when no human body is close to it and thus the detected capacitance value 14 when a human body is close to it would not reach the preset decision threshold 15, which results in a mistaken determination that no human body is close to it.

The same capacitance unit is adopted for the capacitance values in all the above examples.

The subject matter described herein provides a sensor correction method based on the angle value between the first body and the second body by considering the effect of the change of the angle between the first body and the second body on the detection of the sensor so as to achieve correct detection of the proximal state/distal state of a human body with respect to the electronic device.

The parameters characterizing the angle between the first body and the second body that is acquired by Step S101 can specifically be the angle value between the first body and the second body. The angle value can be acquired by a respective sensing component. For example, a first angle value, which is a specific angle between 0 and 360 degrees, between the first body and the second body is detected and acquired by an angle sensor. A second angle value, which is 360 degrees, between the first body and the second body is detected and acquired by a Hall sensor, i.e., when the notebook computer is in a tablet mode, the Hall sensor will be triggered to emit a signal, so as to achieve an effective detection of the angle value of 360 degrees.

At step S102, an embodiment may determine whether the angle between the first body and the second body characterized by the parameter meets a preset condition. Generally, with respect to the angle value collected by a sensing component, such as an angle sensor, the smallest unit of 1 degree or of a higher accuracy is applied. In order to avoid frequent correction of the sensor when the angle value between the first body and the second body is changed, the present application presets a condition for correction of the sensor in advance based on the effect of the change of the electromagnetic field on the detection of the sensor when the angle between the first body and the second body is changed. If the angle value between the first body and the second body meets the condition, it characterizes that the change of the electromagnetic field has a significant effect on the detection of the sensor, and the sensor needs to be corrected. On the contrary, if the condition is not met, it characterizes that the change of the electromagnetic field has little effect on the detection of the sensor, and then the sensor is not required to be corrected.

At step S103, responsive to determining, at S102, that the angle between the first body and the second body meets a preset condition, an embodiment may correct the sensor. When the angle value between the first body and the second body meets the preset condition, then the sensor is corrected so as to improve the accuracy of detection of the state of a human body based on the sensor. For example, when the angle value between the main screen and the auxiliary screen meets the preset condition, the capacitive sensor is corrected, so as to improve the accuracy of detection of the state of a human body (the proximal state/distal state relative to the notebook computer) based on the sensor.

From the above solution, it is known that the sensor correction method disclosed by the present application can be used in an electronic device comprising a sensor, a first body and a second body. The method is used for acquiring a parameter characterizing an angle between the first body and the second body and correcting the sensor comprised in the electronic device when the parameter characterizing the angle between the first body and the second body meets a preset condition. Thus, it can be seen that the embodiment can realize correction of the sensor of the electronic device based on the angle between the first body and the second body. Therefore, when the present method is used in an electronic device, such as a notebook computer, it can achieve correction of the capacitive sensor comprised in the notebook computer, so as to realize accurate detection of the proximal state/distal state of a human body with respect to the electronic device, thereby ensuring a correct and accurate adjustment of the transmission power of the device antenna.

Embodiment 2

Figure 2:
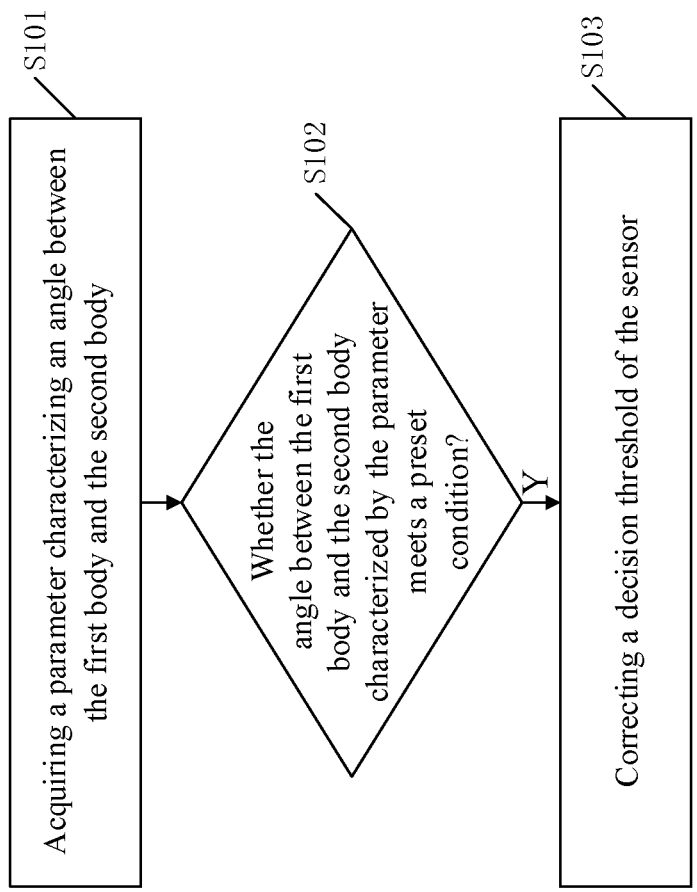
FIG. 2 is a structural schematic flow diagram illustrating a sensor correction method according to an embodiment.

Referring to now FIG. 2, a structural schematic flow diagram illustrating a sensor correction method according to an embodiment is provided. In the embodiment, the step S103 can be implemented by the following steps:

At step S1031, an embodiment may correct a decision threshold of the sensor. When a first data collected by the sensor is less than the decision threshold, the first data corresponds to a first decision result and when a second data collected by the sensor is not less than the decision threshold, the second data corresponds to a second decision result.

In particular, this embodiment corrects the decision threshold of the sensor. This means that this embodiment makes a dynamic adjustment of the decision threshold for determining the proximal state/distal state of a human body based on the angle value between the first body and the second body so as to improve the reference value of the dynamically adjusted decision threshold. This thereby improves the accuracy of detection of the human body state based on the sensor. This is different from the case in which a preset and fixed decision threshold is always used for different angle values. Specifically, this embodiment realizes correction of the decision threshold of the sensor by introducing a correction parameter and then using the data currently collected by the sensor (for instance, a current capacitance value collected by the capacitive sensor) and the introduced correction parameter.

More specifically, taking the capacitive sensor of a notebook computer as an example, when it is determined that the angle value between the main screen and the auxiliary screen accords with the preset condition, the current capacitance value detected by the capacitive sensor will be acquired first. Based on this, the capacitance value and the introduced correction parameter will be accumulated so as to acquire a new decision threshold. Subsequently, prior to the next sensor correction, the new decision threshold will be applied for detecting the state of a human body.

It should be noted that in order to ensure the accuracy of the final decision result, the correction parameter shall not exceed the capacitance value of the detected object. For instance, if the capacitance value of a human body is 10, the correction parameter shall be a specific capacitance value not exceeding 10.

As an example, when the correction condition is met, supposing that the capacitance value currently detected by the capacitive sensor is 20, and supposing that the current decision threshold is 15, the capacitance value of a human body is 10, and the correction parameter is 5 (<10), then, if according to the method using a fixed threshold of the prior art, the distal state of a human body will be mistakenly determined as the proximal state of the human body. While according to the method using a dynamic threshold of the present embodiment, the decision threshold of the capacitive sensor can be adjusted from the current 15 to 20+5=25. Thus, if a human body is not close, the capacitance value detected by the sensor is 20 (<25), and the state detection result is that the human body is far away from it, and when the human body is close, the capacitance value detected by the sensor is 20+10=30 (>25), so the detection result is that the human body is close to it, which means a higher accuracy of detection result.

It should be noted that there is a hypothetic premise for the correction process of the decision threshold in this embodiment, i.e., assuming that a human body is not close when correcting the decision threshold of the sensor as the preset condition is met.

This embodiment makes a dynamic adjustment of the decision threshold applied in determination of the proximal state/distal state of a human body based on the angle value between the first body and the second body and thus effectively improves the reference value of the decision threshold. This thereby improves the accuracy of the state detection result that is based on the sensor data and the threshold.

Embodiment 3

In this embodiment, in step S102, when determining whether the angle between the first body and the second body characterized by the parameter meets the preset condition, the adopted preset condition comprises a characteristic angle value corresponding to the angle value different from the historical characteristic angle value corresponding to the previous correction of the decision threshold and the characteristic angle value is in a preset group of angle values.

As the angle value acquired by a sensing component such as an angle sensor normally adopts an accuracy of 1 degree or even higher, in order to avoid too frequent sensor corrections, this embodiment specifies the characteristic angle value corresponding to an angle value. The characteristic angle value means an angle value of lower accuracy corresponding to the angle. For instance, by rounding the angle value of 1 degree accuracy (for example, by the rounding-off method or the direct mantissa-erasing method), to obtain a characteristic angle value of 10 degree accuracy.

As for the specified characteristic angle values, this embodiment presets a group of angle values, which can be a series of evenly distributed characteristic angle values. For instance, {0, 10, 20, 30 . . . 340, 350, 360}, or unevenly distributed characteristic angle values, for instance {10, 60, 90, 270, 350}. By comparing the above two groups of values it can be found that when the sensor correction is based on the former, the final detection result (for example, the state detection result of a human body relative to the electronic device) is more accurate while the latter can further decrease the correction frequency of the sensor. With respect to a particular implementation of the present disclosure, those skilled in the art would be able to specify the values in the group according to the actual correction requirements.

On the basis of specifying the characteristic angle value of the angle value and presetting a group of angle values, when an angle between the first body and the second body of the electronic device is obtained by a respective sensing component, the characteristic angle value corresponding to the angle value will be determined first, and then determine whether the characteristic angle value is the same as the corresponding historical characteristic angle value for the previous sensor correction. If they are not the same, the embodiment proceeds to search the characteristic angle value in the group of angle values to determine whether the characteristic angle value is included in the group of angle values. If it is included in the group, it indicates that the angle value acquired this time accords with the sensor correction condition and the sensor needs to be corrected. Adversely, if the determined characteristic angle value is the same as the corresponding historical characteristic angle value for the previous sensor correction, or it is not the same, but the characteristic angle value is not included in the group of angle values, it indicates that the angle value acquired this time does not accord with the sensor correction condition and the sensor does not need to be corrected.

By specifying the characteristic angle value for an angle value, determining a group of angle values, and, on this basis, providing a preset condition for a sensor correction, the frequency of correction of the sensor is effectively decreased, thereby decreasing the corrections of the sensor due to slight changes of the angle between the first body and the second body.

Embodiment 4

Figure 3:
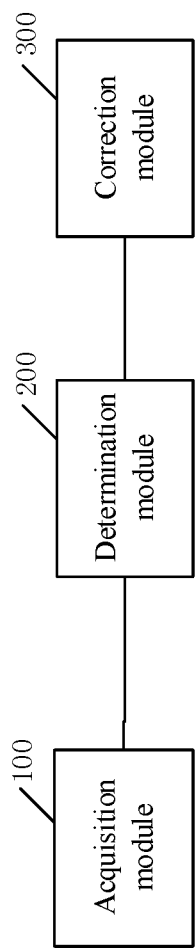
FIG. 3 is a structural schematic diagram showing a sensor correction apparatus according to an embodiment.
Figure 4:
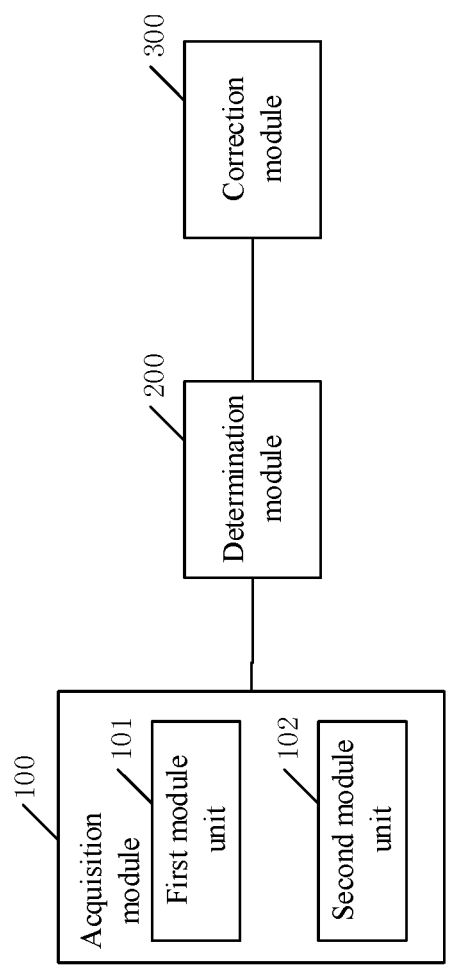
FIG. 4 is a structural schematic diagram showing a sensor correction apparatus according to an embodiment.

Referring now to FIG. 3, a structural schematic diagram showing a sensor correction apparatus according to an embodiment is provided. The device can be used in an electronic device such as a notebook computer, wherein the electronic device comprises a sensor, a first body and a second body. As shown in FIG. 3, the device may comprise an acquisition module 100, a determination module 200 and a correction module 300. The acquisition module 100 is used for acquiring a parameter characterizing an angle between the first body and the second body. Referring now to FIG. 4, which shows a structural schematic diagram showing a sensor correction apparatus according to an embodiment, the acquisition module 100 may comprise: a first acquisition unit 101 for detecting and acquiring a first angle value between the first body and the second body by a first type sensor, where the first angle value being a particular angle between 0 and 360 degrees. A second acquisition unit 102 for detecting and acquiring a second angle value between the first body and the second body by a second type sensor, where the second angle value is 360 degrees. A determination module 200 for determining whether the angle between the first body and the second body characterized by the parameter meets a preset condition. A correction module 300 for correcting the sensor when the determination result of the determination module 200 meets the preset condition.

The acquisition module 100, determination module 200, and correction module 300 may be disposed in an electronic device and perform the functions of the sensor correction method, which are disclosed in paragraphs [0019]-[0030] and are therefore not repeated here.

Embodiment 5

Figure 5:
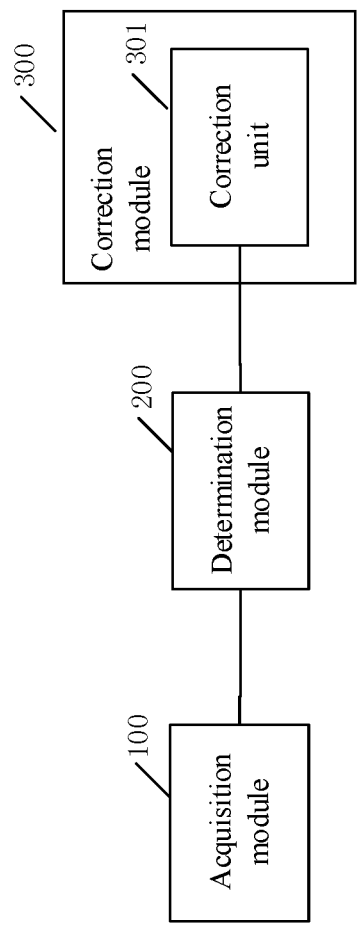
FIG. 5 is a structural schematic diagram of a sensor correction apparatus according to an embodiment.

Referring now to FIG. 5, a structural schematic diagram of a sensor correction apparatus according to an embodiment is provided. In this embodiment, the correction module 300 comprises a correction unit 301 for correcting a decision threshold of the sensor, wherein when a first data collected by the sensor is less than the decision threshold, the first data corresponds to a first decision result and when a second data collected by the sensor is not less than the decision threshold, the second data corresponds to a second decision result. In particular, this embodiment corrects the decision threshold of the sensor. The correction module may be disposed in an electronic device and performs the functions of the sensor correction method, which are disclosed in paragraphs [0031]-[0038] and are therefore not repeated here.

Embodiment 6

In this embodiment, when the determination module 200 determines whether the angle between the first body and the second body characterized by the parameter meets the preset condition, the adopted preset condition comprises a characteristic angle value corresponding to the angle value different from the historical characteristic angle value corresponding to the previous correction of the decision threshold and the characteristic angle value is included in a preset group of angle values. The determination module may be disposed in an electronic device and performs determining functions as those disclosed in paragraphs [0039]-[0043] and are therefore not repeated here.

Embodiment 7

This embodiment discloses an electronic device, which can be an electronic product such as a notebook computer, and the electronic device comprises a sensor, a first body, a second body, and a sensor correction apparatus as disclosed in Embodiments 4-6.

From the above solutions, it is known that the electronic device disclosed by the present application can acquire a parameter characterizing an angle between the first body and the second body by the sensor correction apparatus comprised therein and correct the sensor comprised in the electronic device when the parameter characterizing the angle between the first body and the second body meets a preset condition. Thus, it can be seen that the present application can realize correction of the sensor of an electronic device based on the angle between the first body and the second body. Therefore, when the present method is used in an electronic device, such as a notebook computer, it can achieve correction of the capacitive sensor comprised in the notebook computer so as to realize accurate detection of the proximal state/distal state of a human body with respect to the electronic device, thereby ensuring a correct and accurate adjustment of the transmission power of the device antenna.

It should be noted that, various embodiments in the present description are described in a progressive manner, and each embodiment is focused on their differences from the other embodiments. With respect to the same or similar parts thereof, please make a cross reference to these embodiments.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   identifying, using at least one sensor, an angle value between a first body and a second body of an electronic device;
   determining, using a processor, whether the angle value between the first body and the second body meets a preset condition; and
   correcting, responsive to determining that the angle value between the first body and the second body meets the preset condition, a decision threshold associated with the at least one sensor for managing specific absorption rates (SAR) emitted by the electronic device.

2. The method of claim 1, wherein the correcting the decision threshold comprises adjusting the decision threshold to a corrected decision threshold.

3. The method of claim 2, wherein the adjusting the decision threshold to the corrected decision threshold comprises introducing a correction parameter to the decision threshold.

4. The method of claim 3, wherein the correction parameter does not exceed a capacitance value associated with a detected object.

5. The method of claim 3, wherein the correction parameter is based upon the determined angle.

6. The method of claim 3, wherein the at least one sensor comprises a capacitive sensor.

7. The method of claim 6, further comprising obtaining, using the capacitive sensor, a capacitance value associated with an object.

8. The method of claim 7, further comprising comparing the capacitive value to the corrected decision threshold.

9. The method of claim 8, further comprising determining, based on the capacitive value being higher than the corrected decision threshold, that the object is a proximate object.

10. The method of claim 8, further comprising determining, based on the capacitive value being lower than the corrected decision threshold, that the object is a distant object.

11. An electronic device, comprising:
    a first body;
    a second body;
    at least one sensor;
    a processor;
    a memory device that stores instructions executable by the processor to:
    identify an angle value between the first body and the second body of the electronic device;
    determine whether the angle value between the first body and the second body meets a preset condition; and
    correct, responsive to determining that the angle value between the first body and the second body meets the preset condition, a decision threshold associated with the at least one sensor for managing specific absorption rates (SAR) emitted by the electronic device.

12. The electronic device of claim 11, wherein the instructions executable by the processor to correct the decision threshold comprise instructions executable by the processor to adjust the decision threshold to a corrected decision threshold.

13. The electronic device of claim 12, wherein the instructions executable by the processor to adjust the decision threshold to the corrected decision threshold comprise instructions executable by the processor to introduce a correction parameter to the decision threshold.

14. The electronic device of claim 13, wherein the correction parameter does not exceed a capacitance value associated with a detected object.

15. The electronic device of claim 13, wherein the correction parameter is based upon the determined angle.

16. The electronic device of claim 13, wherein the at least one sensor comprises a capacitive sensor.

17. The electronic device of claim 16, wherein the instructions are further executable by the processor to obtain a capacitance value associated with an object.

18. The electronic device of claim 17, wherein the instructions are further executable by the processor to compare the capacitive value to the corrected decision threshold.

19. The electronic device of claim 18, wherein the instructions are further executable by the processor to determine, based on the capacitive value being higher than the corrected decision threshold, that the object is a proximate object.

20. A product, comprising:
a storage device that stores code, the code being executable by a processor and comprising:
code that identifies an angle value between a first body and a second body of an electronic device;
code that determines whether the angle value between the first body and the second body meets a preset condition; and
code that corrects, responsive to the code that determines that the angle value between the first body and the second body meets the preset condition, a decision threshold associated with the at least one sensor for managing specific absorption rates (SAR) emitted by the electronic device.

* * * * *

UNITED STATES PATENT AND TRADEMARK OFFICE
CERTIFICATE OF CORRECTION

PATENT NO. : 10,473,450 B2
APPLICATION NO. : 15/612857
DATED : November 12, 2019
INVENTOR(S) : Shuxian Zhang Page 1 of 1

It is certified that error appears in the above-identified patent and that said Letters Patent is hereby corrected as shown below:

On the Title Page

Item (73):
DELETE "Lenovo (Singapore) Pte. Ltd., Singapore (SG)"
INSERT therefor --Lenovo (Beijing) Limited, Beijing (CN)--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*